Jan. 6, 1953 P. M. FIELD 2,624,235
COPY LOCATING AND LOADING MEANS FOR PROJECTOR APPARATUS
Filed Oct. 17, 1950 2 SHEETS—SHEET 2

INVENTOR.
PHILIP M. FIELD
BY
*[signature]*
ATTORNEY.

Patented Jan. 6, 1953

2,624,235

UNITED STATES PATENT OFFICE 2,624,235

COPY LOCATING AND LOADING MEANS FOR PROJECTOR APPARATUS

Philip M. Field, New York, N. Y., assignor to Charles Beseler Company, Newark, N. J., a partnership Application October 17, 1950, Serial No. 190,582

4 Claims. (Cl. 88—26)

1

The invention relates to projector apparatus designed more especially for the projection upon a suitable screen of opaque copy such as photographs, post cards, pages of a book or magazine, as well as three-dimensional objects.

It has for an object to provide a novel copy-support member whereby the loading and removal of copy as well as the positioning of the same for projection is facilitated.

A further object of the invention is to provide means whereby the copy-support member is readily and rapidly adjustable from a projection location to a loading and removal location, and vice versa.

A still further object of the invention is to provide means for locking automatically the copy-support member in one or the other of said locations.

Another object of the invention is to provide manually operable means accessible externally of the projector apparatus housing whereby to shift the copy-support member from one location to the other.

The invention has for an object, also, to provide a simple and rugged copy-support member readily attachable to the framing of the projector apparatus.

In carrying out the invention, the copy-support member may be constructed of a flat plate having upturned ends and downturned sides, the latter having pivotally attached thereto the one end of two normally parallel pairs of arms, the opposite ends of which are pivoted to the projector apparatus frame in a common plane parallel to the said plate when the latter is in its operative location, the whole unit constituting normally a parallelogram.

However, when the one pair of arms is depressed beyond said pivotal plane, the support member will lock the former but now distorted parallelogram through engagement of the said depressed arms with suitable stops of the projector frame. The support member will then be in a more or less inclined position to receive copy or for removal of copy therefrom; and by then exerting pressure upon the support members as through a suitable operating handle or the like attached, for example, to one of its upturned ends, the support member is returned to its operative location, being assisted thereto through the action of resilient means on the other pair of arms. These were limited in their upward movement when the support member became locked through the engagement with the stops.

The nature of the invention, however, will best

2 be understood when described in connection with the accompanying drawings, in which:

Figure 1:
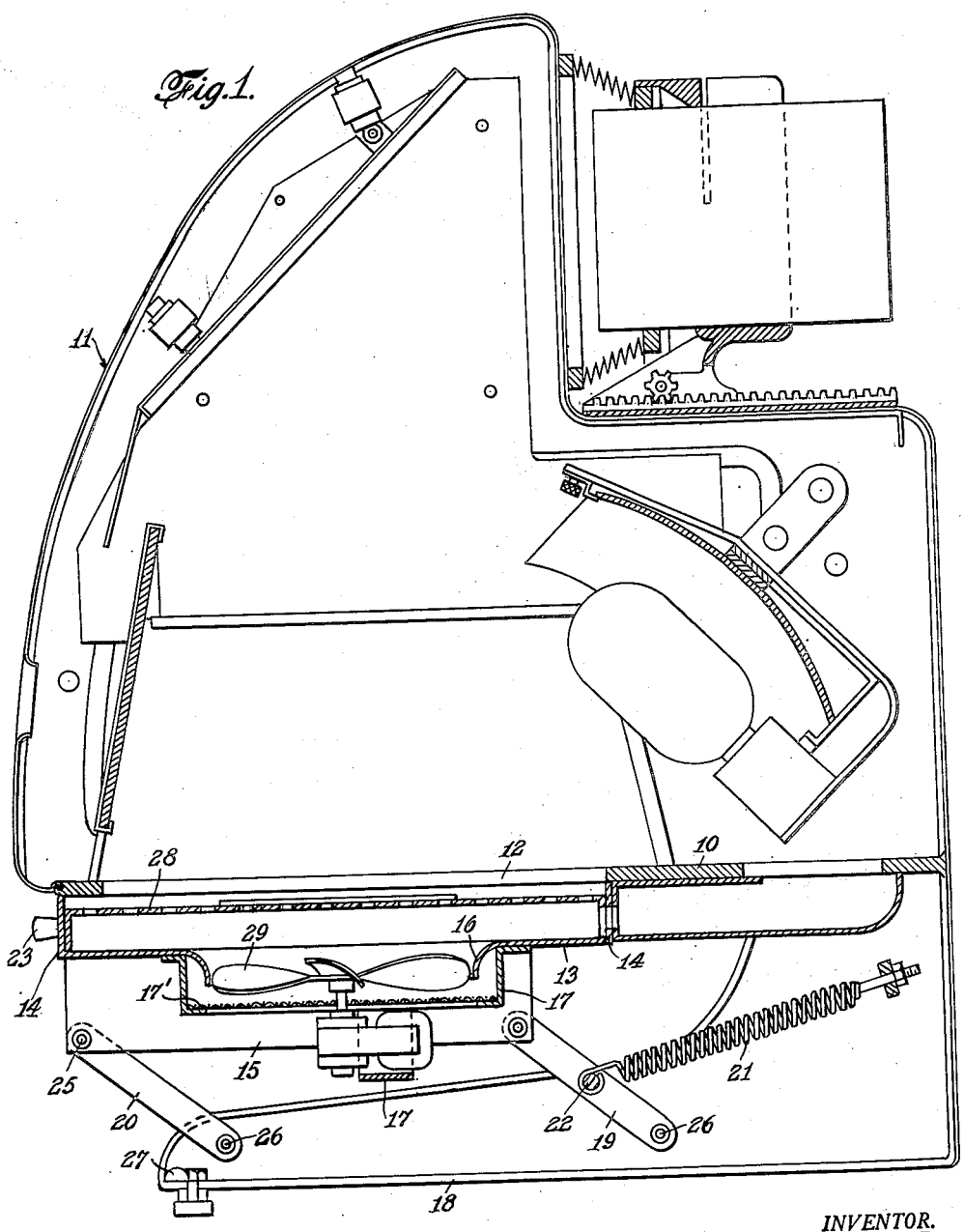
Fig. 1 is a longitudinal section through an opaque copy projector apparatus equipped with the novel copy-support member.
Figure 2:
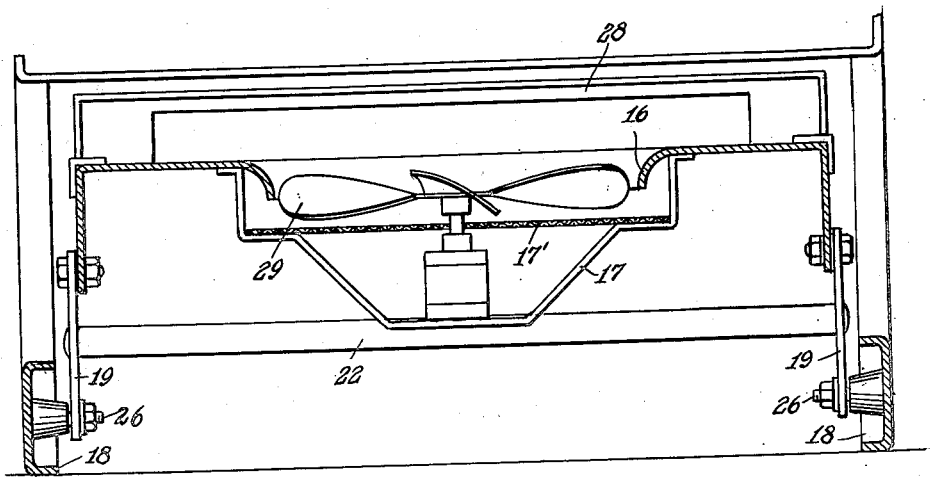
Fig. 2 is a fragmentary transverse vertical section through the copy-support member.
Figure 3:
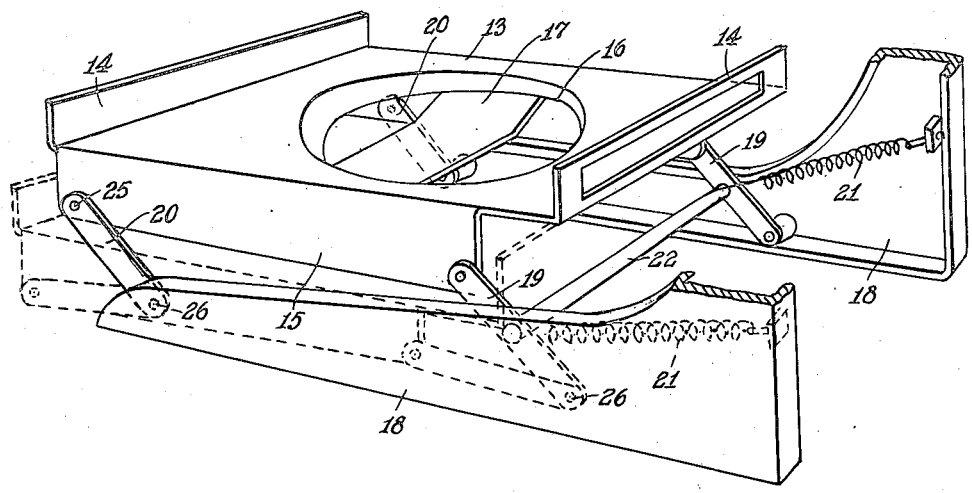
Fig. 3 is a view in isometric projection illustrating the copy-support member and portions of the projector housing.

Referring to the drawings, 10 designates a horizontal frame or plate portion of a projector apparatus indicated by its housing 11 and of the general nature of that set forth in my prior U. S. Letters Patent No. 2,463,026. The frame portion 10 is provided with an aperture 12 designed to accommodate the novel support member in presenting the copy for projection. It comprises a substantially rectangular plate or platen 13 which is provided with integral upturned ends 14 and downwardly turned sides 15.

At its central portion, plate 13 is depressed to provide an opening 16 and carries as well a supporting bracket 17 with air discharge screen 17' beyond the opening. The plate 13 is pivotally connected to the bottom frame portions 18 as through a forward pair of arms 19 and rearward pair 20 normally parallel thereto, the opposite free ends of which pairs of arms are pivoted respectively to forward portions of the sides 15 and to the rearward portions thereof. A pair of springs 21 attached to the forward arms, or rather to a cross rod 22 connecting the same, tend to draw the plate upwardly to the aperture 12 into projection location and as limited by contact with the housing.

An operating knob or handle 23 is secured to the rearward one of the upturned ends 14 of platen 13 for use in depressing the support member, as for loading opaque copy thereon. The parallel arms 19, base 18 and the platen 13 constitute a parallelogram so that when the platen or support member 13 is depressed, it remains parallel to its original position and the parallel arms, of necessity, remain parallel. This geometric relationship is inherent in the assembly until the pivot points of all four members lie in the same plane or neutral position. At this position, the plate might be arranged to continue downwardly parallel to its original position so that the parallelogram relationship is maintained; but, in accordance with the invention, the parallel relationship is arranged to be destroyed with one pair of arms moving upwardly at the expense of the other pair moving downwardly.

This action is forced on the mechanism by the springs 21 which constantly urge the forward arms upwardly. However, the forward arms can only continue upwardly as long as the rear arms are permitted to move downwardly; and by stopping this downward motion of the rear arms, as by having them contact the bumpers 27, the mechanism becomes locked. The action is reversed by raising the rear arms past the neutral position thus to restore the parallel relationship.

The said copy is conveniently supported, for example, on an inverted tray member 28, the supporting surface of which is perforated for the purpose of retaining positively the copy under suction produced by a fan 29 carried by the plate 13—all of which is more fully set forth in my application for U. S. Letters Patent re: Copy Retention and Housing Ventilating Means for Projector Apparatus, Ser. No. 190,584, filed October 17, 1950.

I claim:

1. In apparatus for projecting upon a screen an image from opaque copy, said apparatus including a housing and a movable copy-receiving platen therein: means to support the platen alternatively in a projection horizontal plane and a depressed stationary loading position—the latter location for the reception on and removal therefrom of copy, said means comprising two depressible pairs of normally parallel arms pivoted at their one end to the platen and at the opposite end to the housing in a common and fixed pivotal plane parallel to said platen in its projection plane location: resilient means attached to one pair of the pairs of arms and to the housing to draw said platen to its most elevated and projection plane location; manually operable means accessible externally of the housing to effect the elevation and depression of the platen, the other pair of arms being depressible, relatively to the housing, to an angular position below the said common and fixed pivotal plane; and bumper means on the housing below said common and fixed pivotal plane adapted for engagement with the said other pair of arms to limit the extent of downward displacement thereof, and said one pair of arms attached to the resilient means being restrained under the action of said bumper means when contacting the said other pair of arms from following in the opposite direction to a degree greater than that determined by the said downward contacting displacement.

2. Projection apparatus of the nature set forth in claim 1, wherein the portion of the platen between the upper pivotal points for the arms along with the arms and the frame portion between the lower pivotal points for the arms form a flexible parallelogram.

3. Projection apparatus of the nature set forth in claim 1, wherein the platen comprises a flat element having upturned ends and downturned sides to which latter the parallel arms are pivoted at their one end.

4. Projection apparatus of the nature set forth in claim 3, wherein a handle is attached to one of the upturned ends to constitute means for manually shifting the parallelogram to its respective positions.

PHILIP M. FIELD.

REFERENCES CITED

The following references are of record in the file of this patent:

UNITED STATES PATENTS

| Number | Name | Date |
|---|---|---|
| 1,580,969 | Dina | Apr. 13, 1926 |
| 1,655,299 | Thornton | Jan. 3, 1928 |
| 1,711,909 | Stalcup | May 7, 1929 |
| 2,463,026 | Field | Mar. 1, 1949 |